March 23, 1965
L. L. ROGERS 3RD
3,174,479
COLLAPSIBLE TRACTION FRAME
Filed Nov. 16, 1962
2 Sheets-Sheet 2
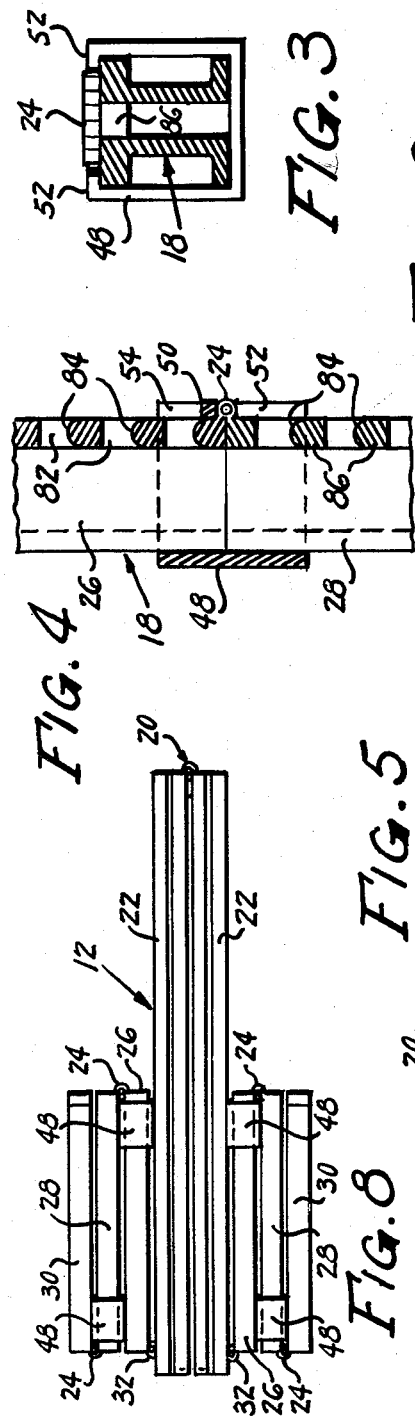
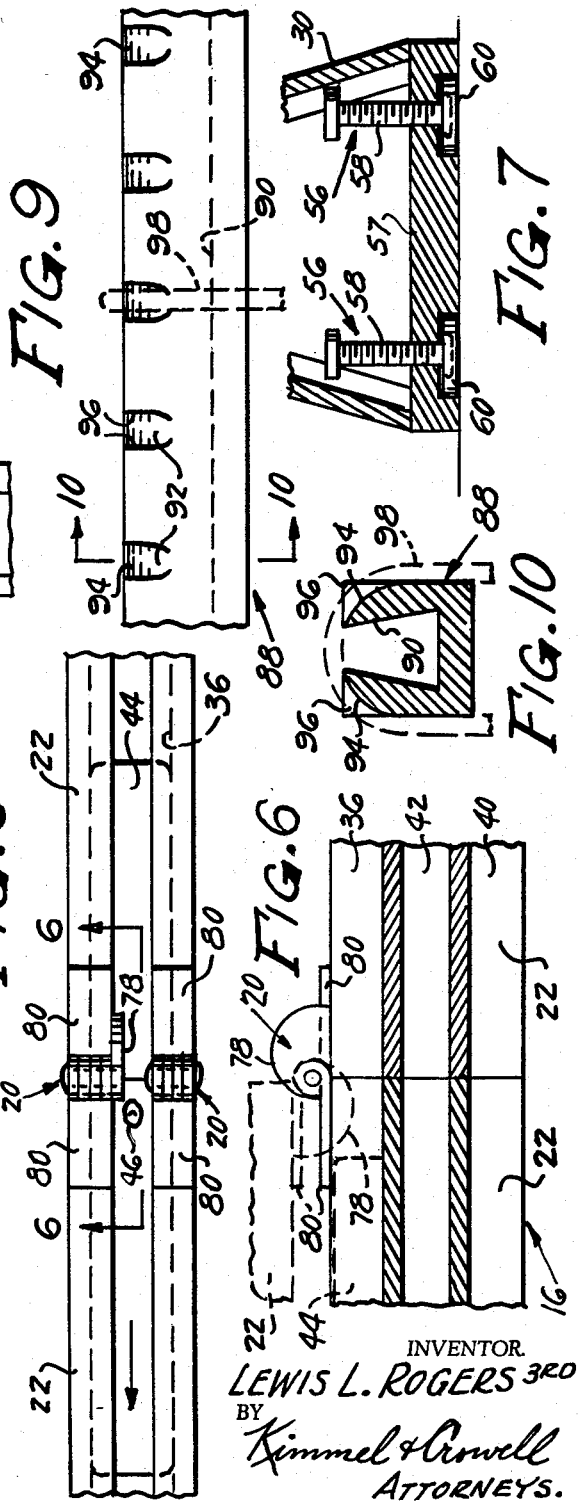
INVENTOR.
LEWIS L. ROGERS 3RD
BY Kimmel & Crowell
ATTORNEYS.

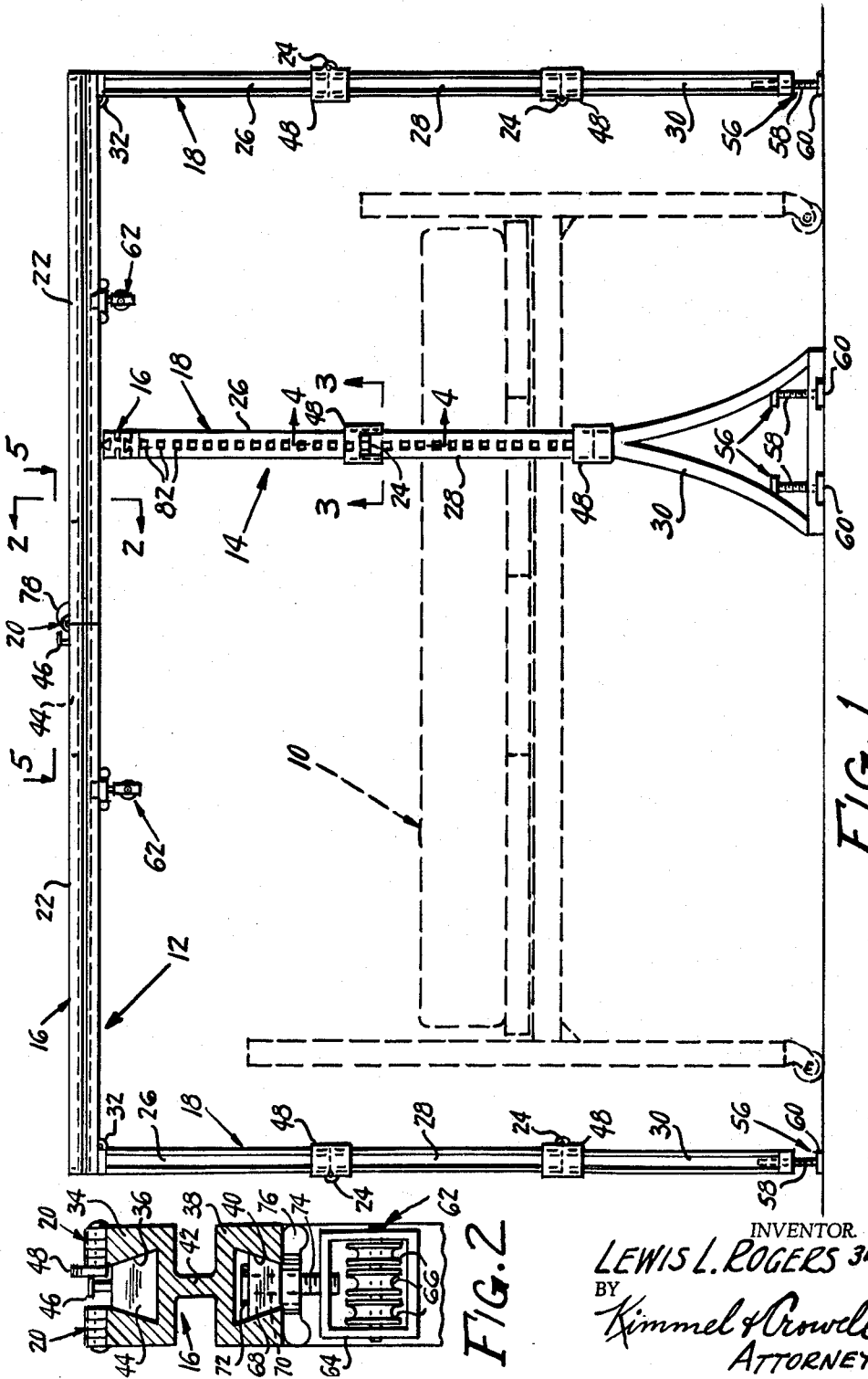

United States Patent Office 3,174,479
Patented Mar. 23, 1965

3,174,479
COLLAPSIBLE TRACTION FRAME
Lewis L. Rogers 3rd, 43 N. Franklin St.,
Wilkes-Barre, Pa.
Filed Nov. 16, 1962, Ser. No. 238,156
6 Claims. (Cl. 128—84)

This invention relates to a traction frame and relates more particularly to a frame for maintaining traction on patients suffering fractures or other orthopedic conditions.

It is an object of this invention to provide a traction frame which may be quickly and easily unfolded from a storage condition and placed in overlying relationship to a hospital bed or the like.

Another object of this invention is the provision of a device of the type described which will provide either longitudinal or transverse traction for adults or infants.

A further object of the instant invention is the provision of a foldable traction frame formed as a single unit carrying all of the necessary components for immediate placement and use.

A still further object of the invention is to provide such a frame which may be quickly and easily folded or collapsed to facilitate handling and storage.

Another object of the instant invention is to provide means for locking the components of the device of the instant invention in extended or unfolded or operative position to prevent collapsing when in use.

An additional object of this invention is the provision of a frame from which traction can be applied in any position.

A further object of the instant invention is to provide a traction frame which is independently supported separate from the bed with which it is to be used.

A still further object of the instant invention is to provide a device of the character described having vertically adjustable standard members so that both longitudinal and transverse frames may be used concurrently.

A further object of this invention is to provide a device which is inexpensive to manufacture, sturdy in construction and efficient and reliable in use.

Other and further objects reside in the combination of elements, arrangement of parts and features of construction.

Still other objects will in part be obvious and in part be pointed out as the description of the invention proceeds and as shown in the accompanying drawings wherein there are disclosed preferred embodiments of this inventive concept.

In the drawings:

FIGURE 1 is a side elevational view of the relationship of a longitudinal traction frame in accordance with the instant invention to a hospital bed shown in dotted lines and an end elevational view of the relationship of a transverse traction frame in accordance with the instant invention with the same hospital bed;

FIGURE 2 is a transverse cross sectional view to an enlarged scale of one embodiment of an overhead bar for the device of the instant invention, showing the relationship thereto of a locking means and an adjustably carried pulley housing, taken on line 2—2 of FIG. 1, with parts broken away for illustrative clarity;

FIGURE 3 is a transverse cross sectional view to an enlarged scale of one of the standard members supporting the overhead bar of the device of the instant invention showing a bottom view of one embodiment of a locking collar and taken on line 3—3 of FIG. 1;

FIGURE 4 is a fragmentary longitudinal cross sectional view to an enlarged scale of a portion of one of the standard members as it is held in assembled relationship by the aforementioned locking collar and taken on line 4—4 of FIG. 1;

FIGURE 5 is a fragmentary top plan view to an enlarged scale of a portion of the overhead bar in accordance with one embodiment of the instant invention, taken on line 5—5 of FIG. 1;

FIGURE 6 is a fragmentary transverse cross sectional view of the hinged portion of the overhead bar taken on line 6—6 of FIG. 5 and showing the relationship between the elements in the collapsed position in dotted lines, with parts broken away for illustrative convenience;

FIGURE 7 is a longitudinal cross sectional view to an enlarged scale through a portion of the base section of one of the standard members showing means to vertically adjust the same;

FIGURE 8 is a top plan view of the device of the instant invention in collapsed relationship;

FIGURE 9 is a fragmentary side elevational view of another embodiment of an element which can be used as the overhead bar of the device of the instant invention and/or the upper portion of each of the standard members, showing in dotted lines the manner in which a rope loop would be mounted thereover, with parts broken away for illustrative convenience; and FIGURE 10 is a transverse cross sectional view taken on line 10—10 of FIG. 9.

Like reference characters refer to like parts throughout the several views of the drawing.

Referring now to the drawings in detail and more particularly to FIGURE 1, a hospital bed or the like is shown in dotted lines and is indicated generally by the reference numeral 10. A longitudinal traction frame in accordance with the instant invention is shown in overlying relationship with the bed 10 and is designated generally by the reference numeral 12. Extending crosswise of the bed 10 is a transverse traction frame in accordance with the instant invention and generally designated 14.

Each of the traction frames 12 and 14 are comprised of an overhead bar 16 and a pair of standard members 18, the latter having planar top surfaces. The only difference between the two devices is that in the longitudinal traction frame 12 the overhead bar 16 is sufficient in length to overlie the long dimension of the bed 10, whereas in the transverse traction frame 14 the overhead bar 16 is only sufficiently long to overlie the width of the bed 10.

A hinge means 20 foldably secures two overhead members 22 which together form the overhead bar 16. The hinge opens to 180° maximum and folds to zero degrees minimum. Each standard member is formed of hinge means 24 foldably securing an upper section 26 to an intermediate section 28 and an intermediate section 28 to a base section 30.

It is to be understood that while the overhead bar 16 has been shown as foldable in half and the standard members 18 foldable in thirds, any relationship between these elements convenient for transporting and storage may be employed.

A pair of hinge means 32 foldably secure each of the standard members 18 adjacent one end of the overhead bar 16 to support the latter element in overlying relationship to the bed 10. The hinge opens to 90° maximum and closes to zero degrees minimum.

The entire traction frame is foldable to the compact collapsed relationship shown in FIGURE 8 for handling and storage purposes.

The overhead bar 16 will be of extruded aluminum or the like and as seen from FIGURE 2 has a double profile and a planar base or bottom surface. An upper portion 34 has means defining a longitudinally extending trapezoidal locking channel 36 opening upwardly and a lower portion 38 has means defining a longitudinally extending trapezoidal pulley channel 40 opening downwardly. While the two portions 34 and 38 may have common interface, the extrusion shown in FIGURE 2 has a web portion 42 interconnecting them.

Slidably secured within the locking channel 36 in one of the overhead elements 22 of the overhead bar 16 is a locking bar 44, trapezoidal in cross section and having an upwardly extending lug 46 to assist in moving the same within the locking channel 36. The locking bar 44 may be slid from the dotted position of FIGURE 6 in which the overhead bar 16 may be folded into collapsed relationship about the hinge means 20, to the locking position shown in FIGURE 5 where it bridges the hinge means 20 and extends between the locking channels 36 in both overhead members 22 to lock the overhead bar 16 in its assembled relationship.

The hinge means 20 securing the overhead elements 22 of the overhead bar 16 to each other will preferably carry a blocking member 78 comprising an enlarged mass of material which will be rotated from the full line position in FIGURE 6 where it is remote from the locking channel 36 so that the locking bar 44 can be slid therethrough to lock the overhead bar 16 in assembled relationship, to the dotted position of FIGURE 6 where it depends into the locking channel 36 to prevent the locking bar 44 from sliding out of the locking channel 36 when the overhead bar 16 is folded in collapsed relationship. Note particularly FIGURES 5 and 6. The hinge means 20 may be formed in two separate sections having straps 80 securing the same to the overhead bar 16 and the blocking member 78 may be carried by one of these elements as shown in FIGURES 2, 5 and 6. It is to be understood that although in this embodiment the hinge means 20 does not extend across the locking channel 36 to allow the handle or lug 46 of the locking bar 44 to slide freely therethrough, the blocking member 78 may extend over the locking channel 36 and integrally connect the two hinge portions of the hinge means 20.

The standard members 18 are held in assembled relationship by locking collars 48 which are slidably secured over the standard members 18 above each hinge means 24. The locking collars 48 circumscribe the standard members 18 and have a cross bar 50 and a downwardly extending locking sleeve 52. Note particularly FIGURE 4. A slot 54 is cut in the upper portion of the locking collar 48 for a purpose to be further described hereinafter. The locking collar 48 can be slid downwardly over the standard member 18 until the cross member 50 abuts the hinge means 24 and the locking sleeve 52 extends over a portion of the next lower foldably-secured section such as 28 shown in FIGURE 4 to maintain the standard member 18 in its assembled relationship. In order for the standard member 18 to be collapsed, the locking collar 48 is merely slid in an upward direction to free the hinge means 24.

The base section 30 of each of the standard members 18 is generally triangular shaped as seen in FIGURE 1 and has a pair of adjustable means 56 to allow the standard members 18 to be elongated so that one traction frame may overlie another if a plurality are to be used with a single bed 10. Note the relationship of the longitudinal traction frame 12 to the transverse traction frame 14 in FIGURE 1. Each of the adjusting means 56 is comprised of an elongated bolt member 58 threadably secured in the cross brace 57 of the base section 30 and carries a pair of footings 60 made of rubber or the like adjacent its bottom end. Note particularly FIGURE 7.

The lower portion 38 of the overhead bar 16 shown in FIGURE 2 may adjustably carry a plurality of pulley means shown generally at 62 in FIGURE 1. Each pulley means 62 is comprised of a pulley housing 64 and at least one rotatably secured pulley 66, three being shown in FIGURE 2 for illustrative convenience.

A pulley anchor 68 is formed of a flexible material such as rubber or the like and has a bolt means 70 secured therethrough. The bolt means 70 has a head portion 72 and a threaded lower portion 74 and a locking means such as a wing nut 76 is secured over the threaded portion 74 in abutting relationship with the lower surface of the overhead bar 16 adjacent the open mouth portion of the pulley channel 40. The pulley housing 64 is threadably secured over the end of the bolt means 70 below the wing nut 76.

By loosening the engagement of the wing nut 76 with the lower surface of the overhead bar 16, the pulley anchor 68 may be expanded to its normal dimensions and slidably adjusted in the pulley channel 40 to position the pulleys 66 anywhere along the length of the overhead bar 16. By tightening the wing nut 76 against the lower surface of the overhead bar 16 the flexible pulley anchor 68 is squeezed against the surfaces of the pulley channel 40 to retain the same in fixed relationship to the overhead bar 16.

At least a substantial portion of each of the standard members 18, preferably approximately the upper two thirds thereof is extruded in a channel shape as shown in FIGURE 3 to reduce the weight and thus render the frame more readily portable. A plurality of vertically spaced apertures 82 are defined in this portion comprised of the upper and intermediate sections 26 and 28, respectively, of the standard members 18. The upper surfaces 84 of the web portions 86 extending between the apertures 82 are curved and highly polished (note FIGURE 4) to slidably support the traction rope (not shown) in a conventional manner. The slot 54 of the locking collar 48 exposes one of the apertures 82.

The overhead bar may take the form of an extruded member such as 88 shown in FIGURES 9 and 10 having a trapezoidal locking channel 90 defined therein similar in form and function to the locking channel 36 described hereinbefore. A plurality of longitudinally spaced grooves 92 are defined in the overhead bar 88 having curved upper surfaces 94 and ledge portions 96. A rope loop indicated in dotted lines at 98 will carry at its lower end a pulley housing (not shown) similar to the housing 64 in FIGURE 2 and rotatably supporting at least one pulley similar to 66 in the well known manner. The rope loop 98 will be large enough to be lifted out of one of the grooves 92 and slid longitudinally of the bar 88 until it is engaged in another of the grooves 92 to maintain the pulley housing in a chosen relation to the overhead bar 88.

It will be seen that the member shown at 88 in FIGURES 9 and 10 could be also used in place of the apertured upper and intermediate sections 26 and 28, respectively, of each of the standard members 18. The only difference in function would be that the rope loop 98 would be supported on the lowermost ledge portion 96 of each groove 92 and the pulley housing (not shown) would rest against the side of the standard member 18 to allow a traction rope to be slidably supported on its rotatably mounted pulley.

The use and operation of the device of the instant invention will now be apparent. The traction frame such as the longitudinal frame 12 will be unfolded from its collapsed position shown in FIGURE 8 to its assembled position shown in FIGURE 1 about each of the hinge means 20, 24 and 32. It will be understood that the hinge means 20 and 24 will each unfold 180° while the hinge means 32 will only unfold 90°. A locking bar 44 will then be slid in the locking channel 36 of the overhead bar 16 to the position shown in FIGURE 5 where it bridges the hinge means 20 and maintains the overhead bar 16 in its assembled relationship. Each of the locking collars 48 will then be slid in place over their associated hinge means 24 to maintain the standard members 18 in their assembled relationship. The adjustable means 56 will be threaded either upwardly or downwardly to level the device if it is used on an uneven floor such as would be necessary under emergency conditions in a tent or the like or in order to allow both a longitudinal and a transverse traction frame to be used on the same bed such as shown in FIGURE 1. The traction rope (not shown) can then slidably be supported through any of the longitudinally adjustable pulley means 62 in the overhead bar 16, through the apertures 82 over the highly polished upper surfaces 84 of the web members 86 in each of the standard members 18 or over the pulleys (not shown) supported on the cord rope 98 if the embodiment of FIGURES 9 and 10 is to be used. Thus, either longitudinal or transverse traction may be applied to any size patient, from adults to infants.

It will now be seen that there is herein provided a device which accomplishes all of the objects of the instant invention and others including many advantages of great practical utility and commercial importance.

Since many embodiments may be made of this inventive concept and since many modifications may be made of the embodiments hereinbefore shown and described, it is to be understood that all matter herein is to be interpreted as merely illustrative and not in a limiting sense.

I claim:

1. A frame means for maintaining traction on patients confined to a bed comprising,
   (1) a horizontally extending overhead bar having opposite ends, each end having at its lower side, a portion of a 90 degrees maximum to zero degrees minimum swing hinge means integrally connected thereto,
   (2) said bar being foldable intermediate said ends by means of a top mounted 180° maximum to zero degrees minimum hinge means between an extended or unfolded frame relationship and a collapsed or folded frame relationship, the bar carrying movable means to maintain the same in said extended or unfolded relationship,
   (3) two vertically extending standard members each having at least an upper end part and a lower end part and each said upper end part possessing at an inner side the remainder portion of said 90°–0° swing hinge cooperatively and permanently united with said hinge portions on said bar ends, so as to be foldable between an extended or unfolded frame relationship and a collapsed or folded frame relationship,
   (4) grouped common axis pulley means individually carried by said overhead bar for selectably slidably supporting at least one traction rope, and a plurality or matched height aperture means defined in each of said standard members for selectably slidably supporting at least one traction rope.

2. A traction frame in accordance with claim 1 wherein,
   (1) each of said standard members have an intermediate part hinged between said upper end part and said lower end part,
   (2) the hinge between the upper end part and the intermediate end part being at the outside of the member as contrasted with said hinge thereabove at the innerside of said top part, and the hinge between the lower end part and the intermediate end part being at the inside of the member,
   (3) whereby the parts of the standard members are oriented into a Z shape in changing the frame from an extended or unfolded use condition to a collapsed or folded storage condition,
   (4) and a plurality of collar means slidably carried by each standard member so as to be individually movable to and over and away from each of the hinges of the intermediate member, to respectively maintain extended relationship of member parts, and allow collapse of parts for storage conditions.

3. A traction frame in accordance with claim 1 wherein
   (1) said overhead bar is divided at said 180°–0° hinge means into two substantially equal part length members,
   (2) means defining wedge shaped locking channels with open tops and closed outer ends in each of said part length members, the two locking channels being aligned with each other when said overhead bar is in said extended or unfolded relationship,
   (3) a wedge shaped locking bar supported in said locking channel of one of said part length members, and slidable between a first position remote from said hinge means to allow said overhead bar to be folded to said collapsed or folded relationship, and a second position bridging said hinge means and extending between said locking channels of both of said part length members to maintain said overhead bar in said extended or unfolded relationship.

4. A traction frame in accordance with claim 3 wherein,
   (1) said hinge means carries a blocking member movable with one of said equal length members and located remote or outside of and above said locking channel in said one equal length member when said overhead bar is in said extended or unfolded relationship,
   (2) the blocking member being positioned in said locking channel in said other equal length member when the latter is folded 180° into said collapsed or folded relationship,
   (3) whereby said locking bar is prevented from sliding out of the locking channel in said other equal length member.

5. A frame means for maintaining traction on patients confined to a bed comprising,
   (1) a horizontally extending overhead bar having opposite ends with a planar bottom surface, each end having at its bottom a portion of a 90 degrees maximum to zero degrees minimum swing hinge means integrally connected thereto,
   (2) the bar being foldable intermediate said ends by means of a top mounted 180° maximum to zero degrees minimum hinge means between an extended or unfolded frame relationship and a collapsed or folded frame relationship, the bar carrying movable means to maintain the same in said extended or unfolded relationship,
   (3) two vertically extending standard members each having at least an upper end part with planar top surfaces and a lower end part, and each said upper end part possessing at an inner side the remainder portion of said 90°–0° swing hinge cooperatively and permanently united with said hinge portions on said bar ends, so as to be foldable between an extended or unfolded frame relationship and a collapsed or folded frame relationship, said planar surfaces of bar and standard members substantially abutting in said extended relationship,
   (4) grouped common axis pulley means individually carried by said overhead bar for selectably slidably supporting at least one traction rope and a plurality of matched height aperture means defined in each of said standard members for selectably slidably supporting at least one traction rope.

6. A frame for maintaining traction on patients confined to a bed comprising a horizontally extending overhead bar having two ends and being foldable intermediate said ends between an assembled relationship and a collapsed relationship, vertically extending standard members having an upper end and a lower end hingedly secured at said upper ends adjacent each end of said overhead bar and being foldable intermediate said upper and lower ends between an assembled relationship and a collapsed relationship, means carried by said overhead bar for slidably supporting a traction rope and means carried by each of said standard members for slidably supporting a traction rope, said means carried by said overhead bar for slidably supporting a traction rope including means defining a longitudinally extending pulley channel and a plurality of pulley means slidably secured within said pulley channel, each of said pulley means including a pulley anchor, a pulley housing rotatably supporting at least one pulley and depending from said pulley anchor, said pulley anchor being slidably supported in said pulley channel and means to adjustably secure said pulley anchor in relation to said pulley channel, said pulley channel being trapezoidal in transverse cross-section having two downwardly converging sides and an open lower mouth portion, said pulley anchor corresponding in transverse cross-section to said pulley channel and being formed of a flexible material, a vertically extending bolt means secured to said pulley anchor and having a threaded portion depending below said mouth portion of said pulley channel, locking means threadably secured over said threaded portion of said bolt means in abutting relationship with said overhead bar adjacent said mouth portion of said pulley channel and said pulley housing being secured over said threaded portion of said bolt means below said locking means.

References Cited in the file of this patent

UNITED STATES PATENTS

| | | |
|---|---|---|
| 1,557,055 | Hoyle | Oct. 13, 1925 |
| 1,837,872 | Johnson | Dec. 22, 1931 |
| 2,079,617 | Johnson | May 11, 1937 |
| 2,192,830 | Gerdes | Mar. 5, 1940 |

FOREIGN PATENTS

| | | |
|---|---|---|
| 483,263 | France | June 15, 1917 |
| 535,312 | Great Britain | Apr. 4, 1941 |
| 507,618 | Italy | Dec. 31, 1954 |
| 1,225,872 | France | July 6, 1960 |